P. H. McGIEHAN.
SAFETY NON-SLIPPABLE PEDAL PLATE OR CAP.
APPLICATION FILED JAN. 25, 1916.
1,297,202.
Patented Mar. 11, 1919.
2 SHEETS—SHEET 2.
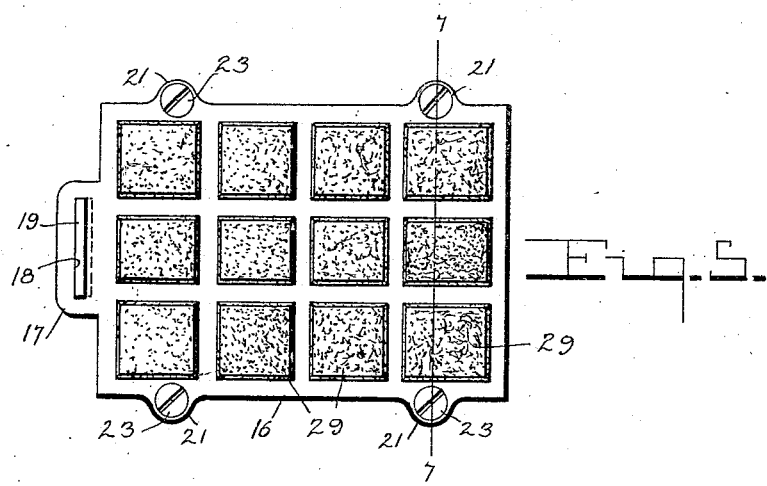
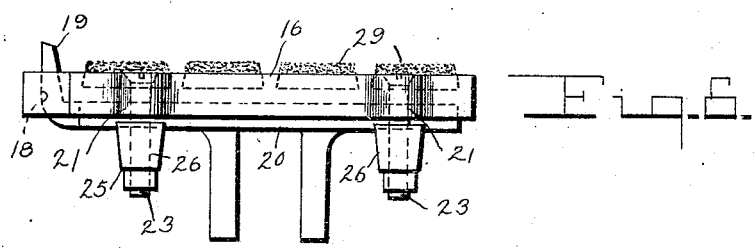
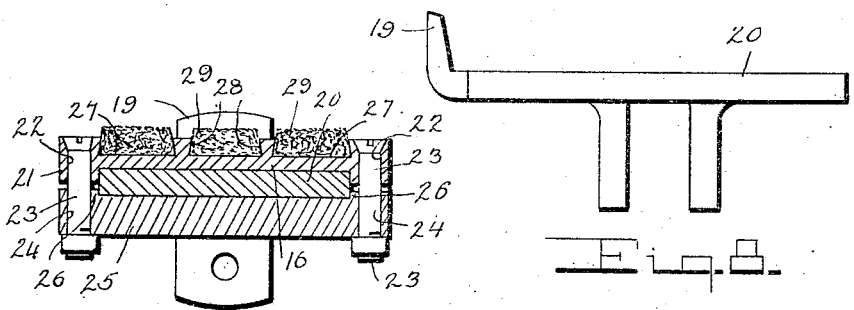
Inventor
P. H. McGiehan

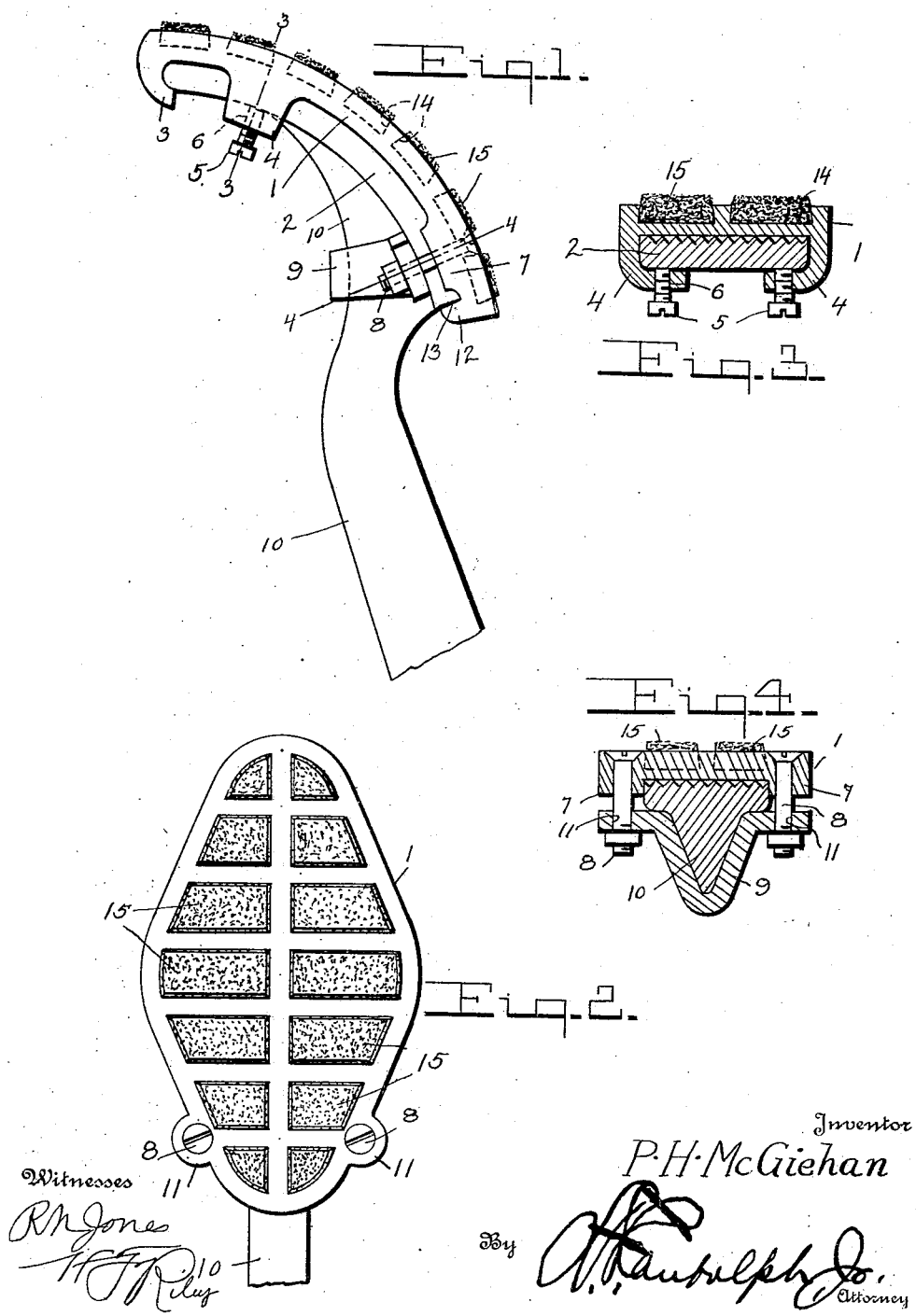

UNITED STATES PATENT OFFICE.

PATRICK H. McGIEHAN, OF NEW YORK, N. Y.

SAFETY NON-SLIPPABLE PEDAL PLATE OR CAP.

1,297,202.   Specification of Letters Patent.   Patented Mar. 11, 1919.

Application filed January 25, 1916. Serial No. 74,173.

*To all whom it may concern:*

Be it known that I, PATRICK H. McGIEHAN, a citizen of the United States, residing at New York, in the county of New York and State of New York, have invented certain new and useful Improvements in Safety Non-Slippable Pedal Plates or Caps; and I do hereby declare the following to be a full, clear, and exact description of the invention, such as will enable others skilled in the art to which it appertains to make and use the same.

The invention relates to improvements in foot pedals.

The object of the present invention is to improve the construction of foot pedals and to provide a simple, practical and comparatively inexpensive non-slippable pedal plate or cap of strong and durable construction designed for use on automobile foot brakes, street car foot brakes, foot power sewing machines, bicycles, trip hammers, punches and various other machines having a foot control and equipped with means for effectually preventing the foot from slipping while operating it whereby loss of control of the machine and accidents resulting therefrom are effectually eliminated.

A further object of the invention is to provide a safety non-slippable pedal plate or cap of this character provided with a non-slip foot receiving surface which will be effective in both wet and dry weather and which will not deteriorate under damp or dry weather conditions.

With these and other objects in view the invention consists in the construction and novel combination and arrangement of parts hereinafter fully described, illustrated in the accompanying drawings and pointed out in the claims hereto appended, it being understood that various changes in the form, proportion and minor details of construction may be resorted to without departing from the spirit or sacrificing any of the advantages of the invention.

In the drawings—

Figure is is a side elevation of a safety non-slippable pedal cap or plate constructed in accordance with this invention and shown applied to a Ford car brake pedal, Fig. 2 is a plan view of the same, Fig. 3 is a transverse sectional view on the line 3—3 of Fig. 1, Fig. 4 is a similar view on the line 4—4 of Fig. 1, Fig. 5 is a plan view of a safety non-slippable pedal cap or plate illustrating another form of the invention, Fig. 6 is a side elevation of the same, Fig. 7 is a transverse sectional view on the line 7—7 of Fig. 5, Fig. 8 is a side view of the foot pedal to which the non-slip pedal is applied.

Like numerals of reference designate corresponding parts in the several figures of the drawings.

In the accompanying drawing in which is illustrated the preferred embodiment of the invention, the safety non-slippable pedal cap or plate comprises in its construction a metallic cap 1 consisting of a plate of any suitable material conforming to the configuration of the pedal to which it is applied and in Figs. 1 to 4 inclusive of the drawings in which it is applied to a Ford air brake pedal 2 it is curved longitudinally and is provided at its upper or front end with a depending flange 3 curved downwardly and rearwardly and conforming to the configuration of and hooking into engagement with the front end of the pedal 2. The plate or body 1 which is normally arranged at a slight inclination is provided at the upper portion with opposite approximately L-shaped arms 4 formed integral with the plate 1 and extending downwardly and inwardly and engaging beneath the pedal 2 and provided with clamping screws 5 mounted in threaded perforations 6 of the lower transversely disposed portions of the arms 4 and engaging the lower face of the automobile pedal 2, as clearly illustrated in Fig. 3 of the drawings.

The plate or body of the safety non-slippable pedal cap or plate is provided at the rear portion with side lugs or enlargements 7 projecting below the said plate or body and engaging the automobile pedal 2 at opposite sides thereof and provided with perforations for the reception of bolts 8 which also pass through a clip bar or member 9 which is in the form of a yoke for embracing the upper portion of the stem or bar 10 of the pedal 2. The clip bar or member 9 is provided at its terminal portions with perforations 11 for the said bolts 8 and the said terminal portions which are straight and extend laterally are located at opposite sides of the central portion of the bar or member 9 which is V-shaped at the central portion. The plate or body 1 is also provided at the rear end with a projecting flange or portion 12 which engages the rear end of the pedal 2 and the inner engaging face of the lug or the flange 13 is slightly beveled or inclined so as to readily drop into engagement with the rear end of the pedal in hooking the safety device thereon. There is sufficient space between the arms and the lower face of the plate or body 1 to enable the device to be readily placed on the pedal 2.

The cap or plate 1 may be made of cast or pressed metal and when cast it will preferably be of iron or brass and is stamped or cut out of sheet steel, aluminum, brass or any other suitable material may be employed. The clip bar may also be constructed of any suitable material and when tightened by the connecting bolt the device will be effectually prevented from rattling and will be securely held in rigid relation with the pedal 2.

The cap or plate 1 is provided in its upper face at intervals with sockets 14 of any desired configuration provided with inclined walls extending downwardly and inwardly and adapted to anchor anti-slipping inserts 15 of plastic abrasive material. The sockets may be formed in any other desired manner to provide enlarged lower or inner portions for anchoring the inserts and the latter project above the upper face of the cap or plate 1 and present anti-slipping surfaces of abrasive material and are adapted to effectually prevent the foot of the operator from slipping in wet or dry weather so that there is no liability of losing control of a machine through the slipping of the foot on the pedal of a brake or other controlling device.

In Figs. 5 to 8 inclusive of the drawings is illustrated another form of the invention comprising a rectangular non-slip foot pedal 16 consisting of a cap or plate provided at the front with a projecting portion 17 having a slot 18 for the reception of the upwardly projecting stop or portion 19 of the pedal of a machine. The pedal 20 consists of a rectangular plate which has flat upper face to receive the safety non-slippable pedal plate or cap and it will be readily understood that the safety non-slippable pedal plate or cap is designed to be constructed to be readily applied to the foot plates or pedals of various standard machines. The cap or plate is provided at its front and rear portions with lugs or enlargements 21 extending downwardly beyond the lower face of the cap or plate to provide projections for engaging the side edges of the pedal 20 and having perforations 22 through which pass bolts 23 which also extend through perforations 24 of clip bars or members 25. The clip bars or members 25 consist of yokes and are provided with lugs or enlargements 26 at their ends forming projections for engaging the side edges of the pedal 20. The pedal 20 is firmly embraced by both by the safety foot pedal cap or plate and the clip members or bars so that the safety foot pedal is firmly held in position. The cap or plate 16 is provided with sockets 27 having inclined walls 28 forming enlarged inner portions and adapted to anchor abrasive anti-slipping inserts 29 which project above the upper face of the cap or plate to prevent the foot from slipping, and to insure a positive operation and control of the pedal in all kinds of weather conditions.

It will be seen that the safety non-slippable pedal cap or plate is exceedingly simple and inexpensive in construction, that it is adapted to be easily and quickly applied to an ordinary pedal and that the projecting spaced abrasive inserts form anti-slipping surfaces at intervening spaces, and effectually prevent a foot from slipping while operating a pedal so that perfect control of a machine is assured.

What is claimed is:—

1. A safety non-slippable pedal cap consisting of a plate having an upper anti-slipping surface and provided at the front with a projecting portion for engaging the front of a foot pedal, said plate being also provided at opposite sides with lugs or enlargements forming projections for engaging the side edges of said pedal, a clip bar or member having terminal portions arranged opposite the lugs or enlargements and fastening devices connecting the clip bar or member to the lugs or enlargements.

2. A safety non-slippable pedal cap consisting of a plate having terminal means for engaging a pedal and provided at opposite sides with lugs or enlargements for engaging the side edges of said pedal, a clip bar or member consisting of a yoke and adapted to extend beneath said pedal and fastening devices connecting the terminal portions of the clip bar or member with the lugs or enlargements 3. A device of the class described including a plate curved longitudinally and provided at the front with a depending hook shaped flange to engage the front end of a pedal and provided also with inwardly extending depending approximately L-shaped arms having clamping means for engaging the lower face of the pedal, said plate having lugs or enlargements in rear of the said arms, a transverse clip plate or member and fastening means for connecting the clip plate or member with the lugs or enlargements.

4. A device of the class described including a plate provided at opposite sides with lugs or enlargements forming spaced projections for engaging the opposite side of a pedal and a clip bar or member consisting of an approximately V-shaped central portion and laterally extending terminal portions adjustably connected with the lugs or enlargements.

5. A device of the class described including a substantially rectangular plate having an upper anti-slipping surface and provided at the front with a projecting portion having a slot to receive a projecting portion of a pedal, said cap or plate being also provided at opposite sides with lugs or enlargements forming projections for engaging the side edges of the pedal and transversely disposed clip bars or members consisting of yokes adapted to engage the pedal and adjustably secured at their terminals to the lugs or enlargements.

In testimony whereof I affix my signature in presence of two witnesses.

PATRICK H. McGIEHAN.

Witnesses:
DAVID GRANT,
E. ROTH.

Copies of this patent may be obtained for five cents each, by addressing the "Commissioner of Patents, Washington, D. C."